US007929603B2

(12) United States Patent
Tan et al.

(10) Patent No.: US 7,929,603 B2
(45) Date of Patent: Apr. 19, 2011

(54) SYSTEM AND METHOD FOR ACCURATE RATE CONTROL FOR VIDEO COMPRESSION

(75) Inventors: Wai-tian Tan, Palo Alto, CA (US); Bo Shen, Palo Alto, CA (US)

(73) Assignee: Hewlett-Packard Development Company L.P., Houston, TX (US)

( * ) Notice: Subject to any disclaimer, the term of this patent is extended or adjusted under 35 U.S.C. 154(b) by 1408 days.

(21) Appl. No.: 11/389,402

(22) Filed: Mar. 24, 2006

(65) Prior Publication Data

US 2007/0223576 A1 Sep. 27, 2007

(51) Int. Cl.
*H04N 11/04* (2006.01)

(52) U.S. Cl. .................................................. 375/240.03

(58) Field of Classification Search ...... 375/240–240.29
See application file for complete search history.

(56) References Cited

U.S. PATENT DOCUMENTS

2004/0114817 A1* 6/2004 Jayant et al. .................. 382/239
2005/0286631 A1* 12/2005 Wu et al. .................. 375/240.12

OTHER PUBLICATIONS

Zhang et al. Research on the Computation Model of Macro Block Coding Based on the Rate-Distortion Optimization, IEEE, 2005, p. 1298-1302.*

* cited by examiner

*Primary Examiner* — Sam K Ahn

(57) ABSTRACT

A method and system for encoding a video frame. The method includes grouping macroblocks of a video frame into a plurality of groups and determining a first encoding rate for at least one of the plurality of groups based on at least one quantization parameter value associated with the group. The method further includes determining a distortion value associated with the first encoding rate and determining a distortion reduction density value based on the distortion value and the first encoding rate. The method further includes accessing a rate budget associated with the frame and adjusting simultaneously a plurality of quantization parameter values associated with one or more of the plurality of groups.

17 Claims, 5 Drawing Sheets

| 101 | 101 | 101 |
|---|---|---|
| 101 | 101 | 101 |
| 101 | 101 | 101 |
| 101 | 101 | 101 |

SYSTEM AND METHOD FOR ACCURATE RATE CONTROL FOR VIDEO COMPRESSION

TECHNICAL FIELD

The field of the present invention relates to video encoding. More particularly, embodiments of the present invention are related to controlling the data-size or bit-rate of video compression.

BACKGROUND

Rate control is one of the most important modules in video coding. One aspect of rate control is related to determining the number of bits given to each video frame (frame level control), so that a specified average bit-rate can be achieved. Another aspect of rate control is related to the allocation of the number of bits within blocks of a video frame given a total number of bits for a video frame (block level control). Traditionally, frame level control and block level controls are performed independently. For example, a video sequence of 100 frames is to be compressed using a total of 1000000 bits. Frame level rate control determines how many bits each of the 100 frames receives to achieve a total of 1 million bits. An example strategy would be to divide it equally, so that each frame will receive 10000 bits. Block level rate control, on the other hand, assumes a given number of bits for a video frame, and distributes them to blocks inside a frame.

An improved system and method for block level rate control would be an improvement over conventional encoding systems and methods.

SUMMARY OF THE INVENTION

Embodiments of the present invention include a system and method for accurate rate control for video compression. Specifically, one embodiment of the invention includes a method for encoding a video frame. The method comprises grouping blocks or macroblocks of a video frame into a plurality of groups and determining a first encoding rate for at least one of the plurality of groups based on at least one quantization parameter value associated with the group. The method further includes determining a distortion value associated with the first encoding rate and determining a distortion reduction density value based on the distortion value and the first encoding rate. The method further includes accessing a rate budget associated with the frame and adjusting simultaneously a plurality of quantization parameter values associated with one or more of the plurality of groups.

BRIEF DESCRIPTION OF THE DRAWINGS—

The above and other objects and advantages of the present invention will be more readily appreciated from the following detailed description when read in conjunction with the accompanying drawings, wherein:

FIG. 1A is an illustration of an exemplary video frame comprising a plurality of blocks or macroblocks in accordance with embodiments of the present invention.

DETAILED DESCRIPTION OF THE INVENTION

Figure 1B:
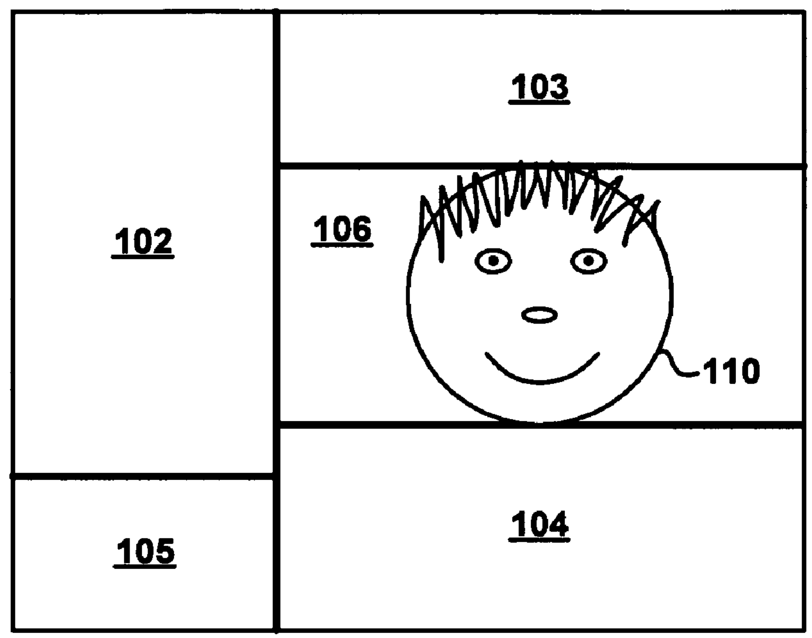
FIG. 1B is an illustration of an exemplary video frame comprising a plurality of macroblocks grouped into a plurality of groups in accordance with embodiments of the present invention.

Reference will now be made in detail to embodiments of the present invention, a system and method for accurate rate control for video compression, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments of the present invention assign a quantization parameter (QP) for each coding unit of a video frame, such as a macroblock, so that the total distortion of the reconstructed frame is minimized and a given target bit budget for the frame is met. In one embodiment of the invention, a distortion value and a rate value associated with each possible QP value is estimated (e.g., computed) based on a model. The present invention then determines a QP for each coding unit given those rate and distortion estimates using a greedy assignment, for example.

FIG. 1 is an illustration of an exemplary video frame 100*a* comprising a plurality of macroblocks 101. In one embodiment of the invention, a quantization parameter (QP) is assigned to each macroblock to effect trade-off between distortion and bit-expenditure. A low quantization parameter corresponds to higher quality (higher fidelity) encoding (uses more bits) and a higher quantization parameter corresponds to a lower quality (lower fidelity) encoding because it uses less bits.

Imagine that each of the macroblocks 101 of video frame 100*a* comprises a knob for adjusting the quantization parameter, the knob having settings between one (high fidelity) and thirty (low fidelity). For a given budget of bits, ideally, the knobs are adjusted such that all of the budgeted bits are used. Using all of the budgeted bits results in the highest fidelity of the frame for a given budget. However, determining the number of bits required to encode a particular macroblock at a particular QP is difficult without actually encoding the macroblock at that particular QP.

Embodiments of the present invention estimate the number of bits needed to code a macroblock at a particular QP, as described below in the section entitled "Estimating Rate at Different QP Values." The estimated values are then used to compute QP values for each of the macroblock.

In one embodiment of the invention, part way through assigning the QP parameters to the macroblocks, a check is performed to see how close the actual number of bits needed to encode is to the budgeted amount. This step is performed by actually encoding a part of the video frame. The actual number of bits needed to encode are compared against the estimated number of bits. If the two values are close, the rest of the frame is encoded according to the QP schedule already determined. If the values are different, the QP values for the remaining macroblocks are adjusted to conform to the budget. For example, if the actual number of bits needed to encode the groups is lower than the estimated number, the fidelity (QP values) for the remaining groups is adjusted so that the budget is reached.

In one embodiment, the coding unit in which tradeoff between fidelity and bit-expenditure is made is a group of blocks (8×8 pixels) or group of macroblocks (16×16 pixels). FIG. 1B is an illustration of an exemplary video frame 100*b* comprising a plurality of blocks or macroblocks grouped into a plurality of groups in accordance with embodiments of the present invention. In one embodiment of the invention, multiple macroblocks of a video frame are grouped. In one embodiment of the invention, the macroblocks are grouped according to the content of the macroblocks. It is appreciated that any number of methods known in the art for grouping macroblocks can be used in accordance with the present invention. For example, individual macroblocks (not shown) that include the face 110, are grouped into macroblock group 106. In one embodiment of the invention, macroblocks in the group 106 are assigned a QP value corresponding to increased fidelity in that region. The remaining groups 102, 103, 104, and 105 might be assigned QP values that decrease fidelity in those regions to maintain a bit budget.

Embodiments of the present invention determine a set of quantization parameter values for groups of macroblocks within a video frame given a bit rate budget. In one embodiment of the invention, the number of bits needed to encode a particular macroblock (or group of macroblocks) is estimated prior to actually encoding the macroblocks.

Estimating Rate at Different QP Values

Figure 2:
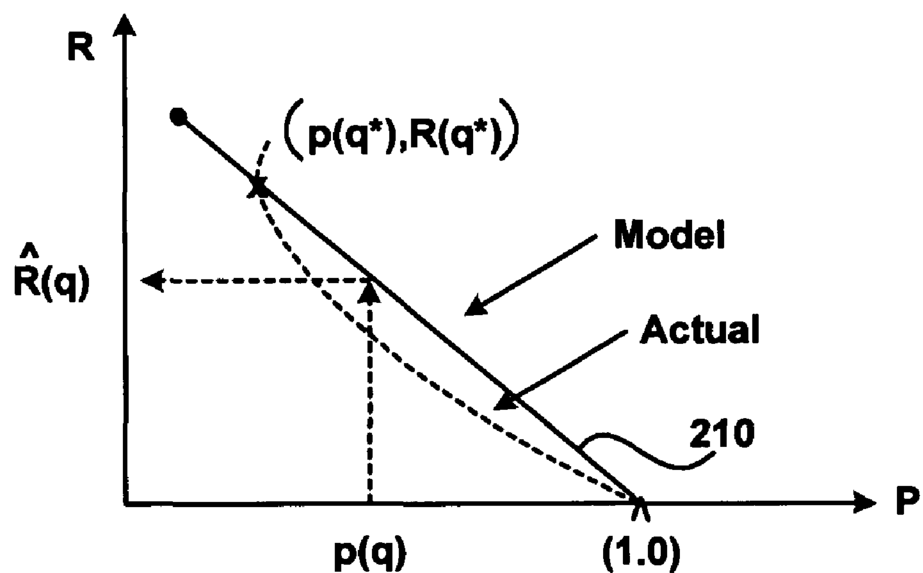
FIG. 2 is an illustration of a chart 200 estimating the number of bits needed to code a macroblock at a particular QP value.

FIG. 2 is an illustration of a chart 200 estimating the number of bits needed to code a macroblock at a particular QP value. $R^{(m)}$ is denoted as the number of bits needed to encode macroblock (m) at QP (q). $R^{(m)}$ (q) can be computed, but is computationally expensive. It is has been determined that there is a linear mapping between rate (R) and number of zero transform coefficients (p). The linear model between R and p has been used for accurate rate control in accordance with embodiments of the present invention.

R(m) (q) is modeled based on the assumption presented above that there is a linear mapping between rate (R) and number of zero transform coefficients (p). For example, for a given q*, if R(m)(q*) is computed, then a point on the R-p plane can be established. Since it takes close to zero bits to code a macroblock full of zeros, another point in the R-p plane can be established, which can be used to define a line 210 which estimates the number of bits needed to code a macroblock for particular QP values. Assuming, linear R-p relationship, the rates for any QP q can be estimated by looking up the R-p function.

In one embodiment of the invention, using aggregate statistics across multiple macroblocks reduces the observed non-linearity. Specifically, in one embodiment of the invention macroblocks in a frame are partitioned into groups of macroblocks, with each group containing one or more macroblocks. Using a large group reduces modeling error (non-linearity) at the expense of losing fine grain rate information. Specifically, rates are estimated at the group level rather than the macroblock level, making it difficult to assign different QP to different macroblocks in a group. In one embodiment of the invention, the same QP is assigned to all macroblocks in a group.

A Method for Assigning QP Values to Macroblock Groups of a Video Frame

Figure 3A:
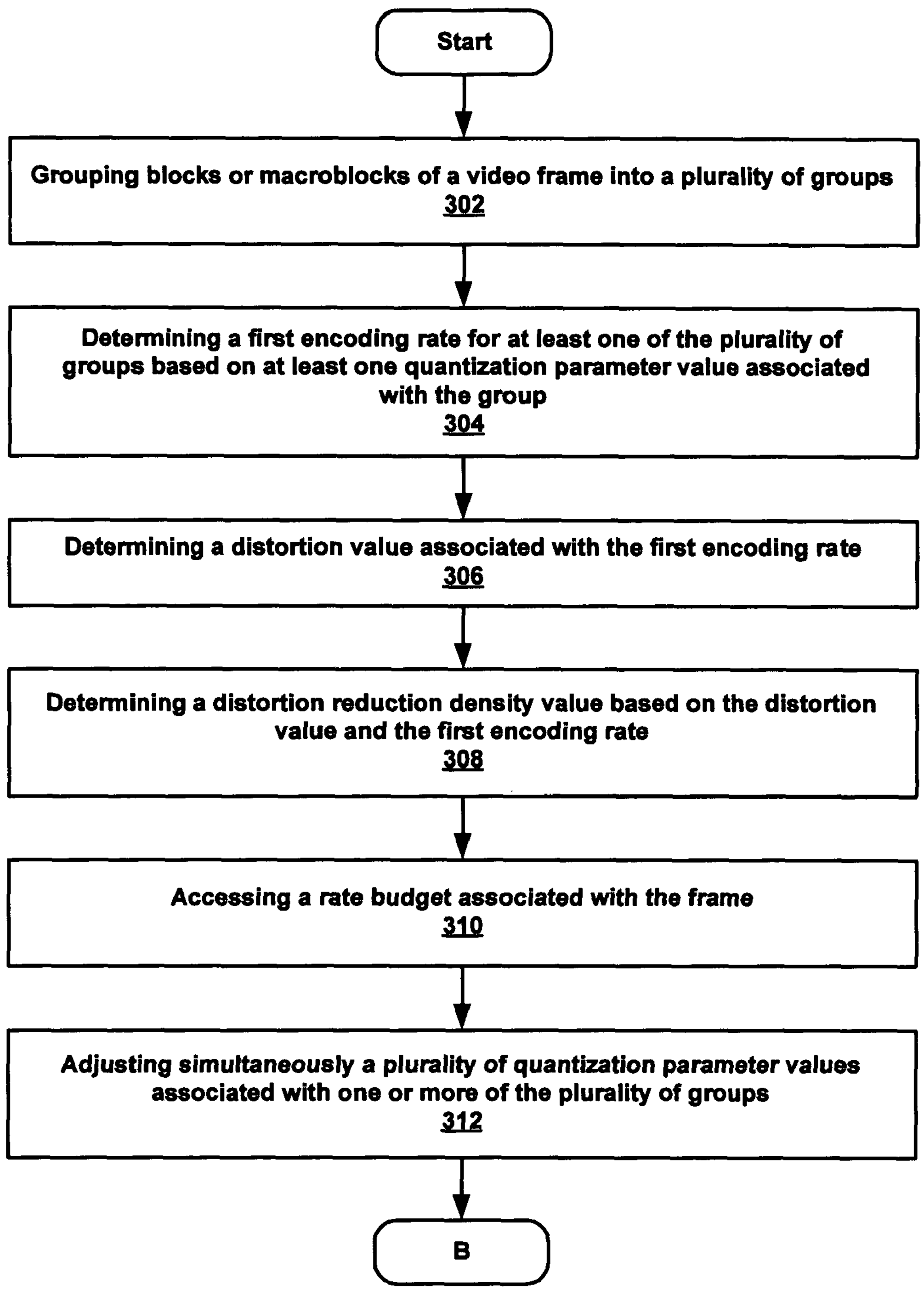
FIG. 3A is a flow diagram of an exemplary method for encoding a video frame in accordance with embodiments of the present invention.

FIG. 3A is a flow diagram of part of an exemplary computer controlled method 300 of encoding a video frame in accordance with embodiments of the present invention. The remaining steps of method 300 are described in conjunction with FIG. 3B. The computer controlled method, according to one embodiment, is implemented with computer program instructions that are encoded on (also known as "stored on") a computer readable storage medium. When the instructions cause a processing system to perform the computer controlled method of encoding a video frame when the instructions are executed by a computer processor associated with the processing system.

At step 302, embodiments of the present invention include grouping macroblocks of a video frame into a plurality of groups. In one embodiment of the invention, macroblocks of a video frame are grouped according to content. For example, all macroblocks of a background image are grouped together and all macroblocks of a foreground image are grouped together. Any number of methods known in the art for grouping macroblocks can be used in accordance with the present invention. In another embodiment, each group contains exactly one macroblock.

At step 304, method 300 includes determining a first encoding rate for at least one of the plurality of groups grouped in step 302. In one embodiment of the invention, a rate for each group is determined for each possible QP value. For example, if there are thirty possible QP values and there are four groups, then 120 rate values are determined in step 304. In one embodiment of the invention, the rates are determined from a model, such as model 200 of FIG. 2. For example, for each QP value, a p value can be determined. From that p value, the model can be used to determine an R value (rate) for each QP value for each group.

In one embodiment of the invention, the initial rate for each group is determined such that that the number of bits required to encode the groups at the initial rate does not go over a threshold value. In one embodiment of the invention, the threshold value is half of the bit budget for the frame. In other words, the initial QP values are set for each group such that approximately one half of the bit budget for the frame is used.

At step 306, method 300 includes determining a distortion value associated with the rates determined in step 304. In one embodiment of the invention, the mean square error (MSE) is calculated to determine the distortion associated with each QP for each macroblock group although, it is appreciated that any method known in the art for representing distortion can be used in accordance with embodiments of the present invention.

At step 308, method 300 includes determining a distortion reduction density value for each QP value for each macroblock. In one embodiment of the invention, higher distortion reduction values correspond to QP values that will improve the fidelity the most at the lowest cost (of bits needed to encode) and lower distortion reduction values correspond to QP values that cost a lot (require more bits to encode) to improve. In one embodiment of the invention, the distortion reduction density is determined by dividing the difference in distortion (for two particular QP values) determined in step 306 by the difference in rate determined in step 304 (for the same QP values). The result can be used to determine which QP values should be adjusted to gain the most fidelity with available leftover bit budget.

At step 310, method 300 includes accessing a rate budget associated with the frame. In one embodiment of the invention, each frame is assigned the same bit budget. In another embodiment of the invention, different frames may have different bit budgets. For example, if one frame goes over budget, the deficit can be made up in the next frame by reducing the bit budget for the next frame. The opposite is also true where one frame is under budget and the next frame is given the surplus bits. It is appreciated that a bit deficit or surplus can be made up over a plurality of frames, or can be made up within a single frame by adjusting QP values for different groups within a frame.

At step 312, method 300 includes adjusting simultaneously a plurality of QP values associated with one or more of the groups of macroblocks. In one embodiment of the invention, the QP values for all of the groups are adjusted simultaneously. In one embodiment of the invention, the QP values are simultaneously adjusted until a predetermined amount of the budget accessed in step 310 is used. For example, in one embodiment of the invention, the QP values for all of the groups are simultaneously adjusted until half of the budget accessed in step 310 is used.

For a given rate budget T, an initial QP ($q_o$) is assigned to each group such that $q_o$ is the smallest QP that satisfies:

$$\sum_G \hat{R}^{(G)}(q) < T/2,$$

where R^(G)(q) is the estimated number of bits the group G needs when QP value of q is used.

The goal of this step is to reduce the number of Greedy assignment steps to be discussed next, thereby reducing the total computation. The leftover budget B becomes:

$$B = T - \sum_G \hat{R}^{(G)}(q_0)$$

Figure 3B:
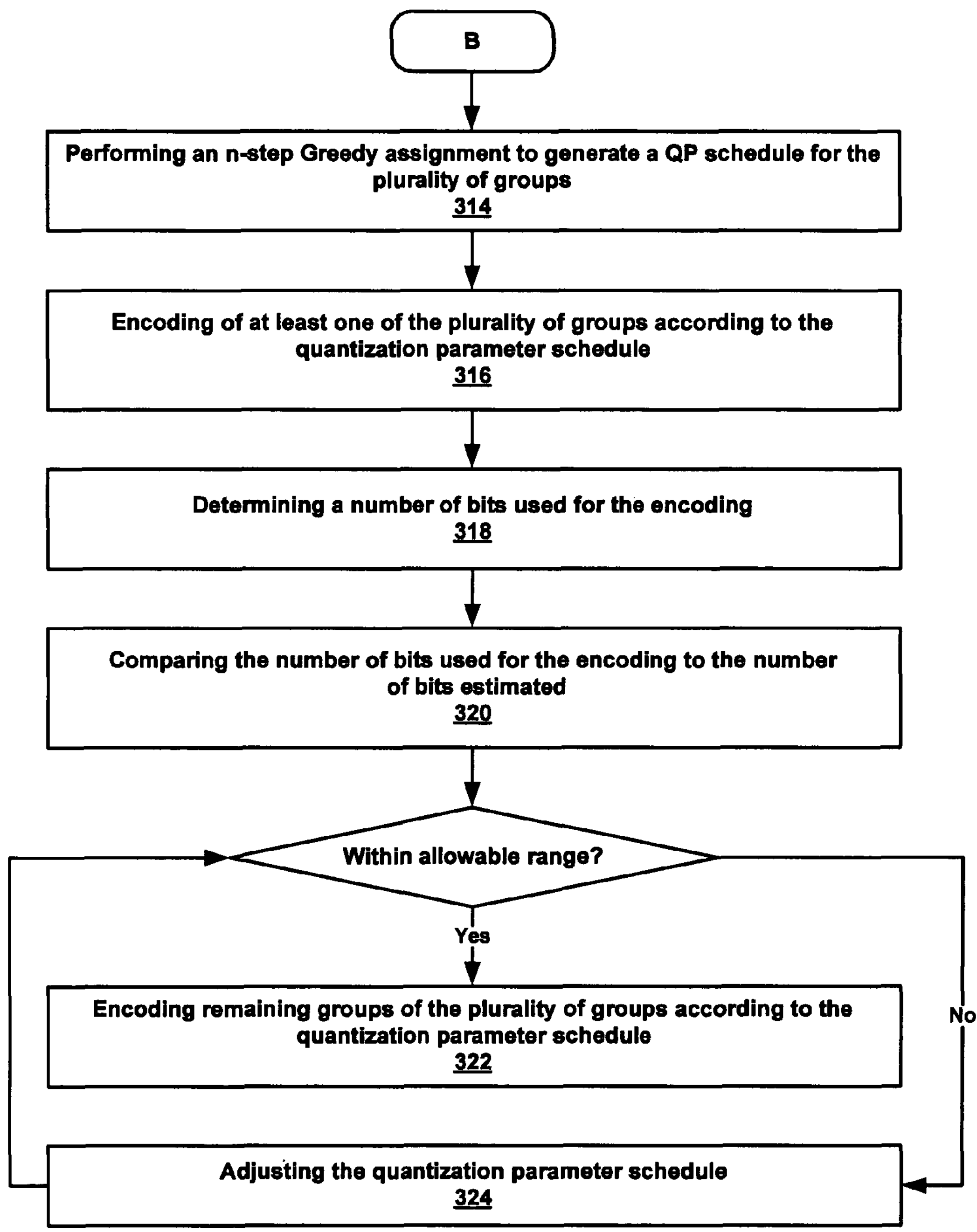
FIG. 3B is a continuation of the exemplary method for encoding a video frame as described in FIG. 3A in accordance with embodiments of the present invention.

FIG. 3B is a continuation of method 300 for encoding a video frame in accordance with embodiments of the present invention. At step 314, method 300 includes performing an n-step Greedy assignment to generate a QP schedule for the plurality of groups. In one embodiment of the invention, a QP value is assigned for each of the plurality of groups in this step. In one embodiment of the invention, some of the QP values for the groups are determined in step 312 and the remaining QP values are determined in step 314. In one embodiment of the invention, the QP values are adjusted in step 312 until half of the bit budget is reached and the remainder of the bit budget is used by adjusting the QP values with the n-step Greedy assignment of step 314. In one embodiment of the invention, the n-step Greedy assignment is performed as follows.

Each MB group G is associated with a current QP value q(G), which is initialized to $q_0$. For $\Delta$ between 1 and $\Delta_{max}$, the Greedy assignment seeks the ($G^*$,$\Delta^*$) that maximizes the distortion reduction density given by:

$$\Omega(G, \Delta) = \frac{D^G(q(G)) - D^G(q(G) - \Delta)}{\hat{R}^{(G)}(q(G) - \Delta) - \hat{R}^{(G)}(q(G))}$$

$$B \leftarrow B - \left(\hat{R}^{(G^*)}(q(G^*) - \Delta^*) - \hat{R}^{(G^*)}(q(G^*))\right)$$

$$q(G^*) \leftarrow q(G^*) - \Delta^*$$

At step 316, method 300 includes encoding at least one of the plurality of groups according to the QP assignments generated in steps 312 and 314. Encoding a frame multiple times is computationally expensive, and as a result, in one embodiment of the invention, only a portion of the groups is encoded in step 316.

At step 318, the actual number of bits used to encode in step 316 is determined. At this point, if the actual number of bits needed to encode the group(s) is more than expected, the QP values for the remaining groups can be adjusted so that the actual number of bits needed to encode is close to the bit budget.

At step 322, provided the actual number of bits used to encode in step 318 is within an acceptable range of the expected number of bits, the remaining groups of macroblocks of the frame are encoded according to the QP assignments determined in steps 312 and 314.

At step 324, provided the actual number of bits used to encode in step 318 is not within an acceptable range of the expected number of bits, the QP assignments determined in steps 312 and 314 associated with the remaining groups of macroblocks of the frame are adjusted to stay within the bit budget.

In the case that the number of bits used to encode is slightly less than expected, the QP assignments for the remaining groups are adjusted such that the bit budget is used. In the case that the number of bits used is slightly higher than expected, the QP assignments for the remaining groups are adjusted such that the bit budget is used but does not go over.

In the case that there is a large difference between the expected number of bits used and the actual number of bits used, in one embodiment of the invention, the QP assignments determined in steps 312 and 314 are not used and process 300 starts again at step 304.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and it's practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer implemented method for encoding a video frame comprising:

grouping blocks or macroblocks of said video frame into a plurality of groups at a computer;

determining an first encoding rate for at least one of said plurality of groups based on at least one estimated quantization parameter value associated with said group at said computer;

determining a distortion value associated with said first encoding rate at said computer;

determining a distortion reduction density value based on said distortion value and said first encoding rate at said computer;

accessing a rate budget associated with said frame at said computer; and adjusting simultaneously a plurality of quantization parameter values associated with one or more of said plurality of groups according to said rate budget at said computer.

2. The computer implemented method as described in claim 1 further comprising:

adjusting simultaneously said plurality of quantization parameter values at said computer until a predetermined amount of said rate budget is reached.

3. The computer implemented method as described in claim 2 wherein said predetermined amount is half of said rate budget.

4. The computer implemented method as described in claim 2 further comprising:

performing an iterative n-step Greedy assignment at said computer to determine a quantization parameter schedule for at least one of said plurality of groups until said rate budget is reached.

5. The computer implemented method as described in claim 4 further comprising:

estimating a number of bits needed to encode at least one of said plurality of groups at said computer.

6. The computer implemented method as described in claim 5 further comprising:

encoding at least one of said plurality of groups according to said quantization parameter schedule at said computer.

7. The computer implemented method as described in claim 6 further comprising:

determining an actual number of bits used for said encoding at said computer; and comparing said actual number of bits used to for said encoding to said number of bits estimated at said computer.

8. The computer implemented method as described in claim 7 further comprising:

provided said actual umber of bits used for said encoding is within an allowable range of said number of bits estimated, said method further comprising encoding remaining groups of said plurality of groups according to said quantization parameter schedule at said computer.

9. The computer implemented method as described in claim 7 further comprising:

provided said actual number of bits used for said encoding is not within an allowable range of said number of bits estimated, said method further comprising adjusting said quantization parameter schedule at said computer.

10. The computer implemented method as described in claim 9 further comprising:

encoding remaining groups of said plurality of groups according to said adjusted quantization parameter schedule at said computer.

11. The computer implemented method as described in claim 1 wherein said macroblocks are grouped according to content.

12. A non-transitory computer readable storage medium encoded with executable computer program instructions which, when executed in a processing system, causes said system to perform a method for encoding a video frame, said method comprising:

grouping blocks or macroblocks of said video frame into a plurality of groups;

determining a first encoding rate for at least one of said plurality of groups based on at least one quantization parameter value associated with said group;

determining a distortion value associated with said first encoding rate;

determining a distortion reduction density value based on said distortion value and said first encoding rate;

accessing a rate budget associated with said frame; and adjusting simultaneously a plurality of quantization parameter values associated with one or more of said plurality of groups according to said rate budget.

13. The non-transitory computer readable storage medium as described in claim 12 wherein said method further comprises:

adjusting simultaneously said plurality of quantization parameter values until a predetermined amount of said rate budget is reached.

14. The non-transitory computer readable storage medium as described in claim 13 wherein said predetermined amount is half of said rate budget.

15. The non-transitory computer readable storage medium as described in claim 13 wherein said method further comprises:

performing an iterative n-step Greedy assignment to determine a quantization parameter schedule for at least one of said plurality of groups until said rate budget is reached.

16. The non-transitory computer readable storage medium as described in claim 15 wherein said method further comprises:

estimating a number of bits needed to encode at least one of said plurality of groups.

17. The non-transitory computer readable storage medium as described in claim 16 wherein said method further comprises:

encoding of at least one of said plurality of groups according to said quantization parameter schedule.

* * * * *

UNITED STATES PATENT AND TRADEMARK OFFICE

CERTIFICATE OF CORRECTION

PATENT NO. : 7,929,603 B2
APPLICATION NO. : 11/389402
DATED : April 19, 2011
INVENTOR(S) : Wai-tian Tan et al.

It is certified that error appears in the above-identified patent and that said Letters Patent is hereby corrected as shown below:

In column 6, line 62, in Claim 1, delete “an” and insert -- a --, therefor.

In column 7, line 38, in Claim 7, after “used” delete “to”.

In column 7, line 43, in Claim 8, delete “umber” and insert -- number --, therefor.

Signed and Sealed this
Thirteenth Day of December, 2011

David J. Kappos
*Director of the United States Patent and Trademark Office*